June 10, 1958 H. E. BESTE 2,838,667

TELEVISION SYSTEM

Filed April 27, 1956 5 Sheets-Sheet 1

INVENTOR.
HAROLD E. BESTE
BY Darby + Darby
ATTORNEYS

June 10, 1958 H. E. BESTE 2,838,667

TELEVISION SYSTEM

Filed April 27, 1956 5 Sheets-Sheet 2

INVENTOR.
HAROLD E. BESTE
BY
Darby & Darby
ATTORNEYS

INVENTOR.
HAROLD E. BESTE
BY Darby & Darby
ATTORNEYS

INVENTOR.
HAROLD E. BESTE
BY
Darby & Darby
ATTORNEYS

June 10, 1958 H. E. BESTE 2,838,667

TELEVISION SYSTEM

Filed April 27, 1956 5 Sheets-Sheet 5

INVENTOR.
HAROLD E. BESTE
BY Darby & Darby
ATTORNEYS

United States Patent Office 2,838,667

Patented June 10, 1958

2,838,667

TELEVISION SYSTEM

Harold E. Beste, Verona, N. J., assignor to Allen B. Du Mont Laboratories, Inc., Clifton, N. J., a corporation of Delaware Application April 27, 1956, Serial No. 581,026

3 Claims. (Cl. 250—27)

This invention relates to decoding systems, and to a novel decoding electron discharge device for use therein.

A current system of color television requires that the color information obtained from pickup devices, such as film or studio cameras, be first converted into color signal components known as "Q" and "I." These signal components are then modulated onto sub-carrier waves of an established frequency to produce a waveform known as the chrominance carrier which is combined with a brightness component, (called the "Y" component) and with a reference "colorburst" frequency for telecasting.

For analytical purposes the instantaneous telecast signal may be considered to be a vector whose phase angle with the reference represents the hue, or color. The amplitude of the vector represents the saturation, or intensity of the desired color. This vector changes both its amplitude and phase angle to represent the instantaneous color that is being telecast.

In a color television receiver, the electrical impulses obtained from the antenna must undergo a series of operations designated as "decoding." These operations are necessary in order to convert the received impulse into a form of color signal which is suitable for application to the picture tube.

Prior art decoding circuits included many separate operations, such as demodulating, matrixing, and mixing, in conjunction with the necessary stages of amplification and isolation.

It is therefore one object of my invention to provide a simpler, improved decoding system.

It is another object to provide an electron discharge device which inherently combines various decoding operations.

It is still another object to provide a single electron discharge device capable of producing various output signals of desired phase and amplitude.

It is a further object to provide a decoding circuit utilizing the novel electron discharge device herein disclosed.

These and other objects will become apparent from a study of the following specifications and the drawings, of which:

My invention contemplates the use of an electron tube wherein the electrons are formed into a sheet-like beam. In the described embodiments, deflection means are provided to give the entire sheet-like beam of electrons either a rotary or an oscillatory movement, thus causing it to "scan" or "sweep" cyclically across collector anodes in synchronism with the reference. As the phase of the input signal varies in accordance with the telecast color, an output signal is derived from the particular collector anodes which correspond to the color composition of the signal. The signals are thus decoded. The anodes themselves are subdivided into sub-anodes which provide specific output signals whose amplitudes are of predetermined ratios. Selective combination of specific output signals achieves the desired matrixing, or mixing.

Figure 1:
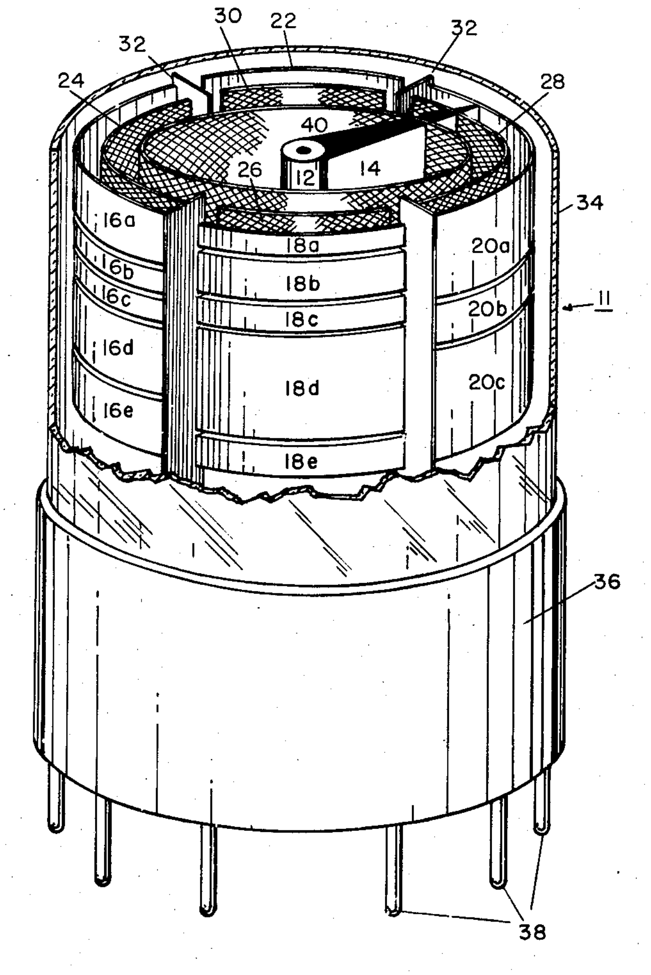
Fig. 1 is a diagrammatic, cutaway representation of one form of the novel decoding electron discharge device of my invention.

Fig. 1 illustrates one embodiment of my novel decoding device. This embodiment utilizes an electron tube 11 of the rotating sheet beam type. An axial cathode 12 emits electrons which are formed by any of several well known structures into a focused sheet-like beam 14. The electrons impinge on collector anodes 16, 18, 20, and 22, any or all of which may be subdivided into sub-anodes which are distinguished from one another by letter suffixes. Rotation control electrodes 24, 26, 28 and 30 receive sequential potentials, causing the entire sheet-like beam of electrons 14 to rotate continuously about the common axis of cathode 12, thus scanning or sweeping across collector anodes 16, 18, 20 and 22 in a repetitive cyclic manner at the reference frequency.

Isolating barriers indicated by reference character 32 are provided to prevent interaction, or cross talk, between collector anodes. Envelope 34 permits evacuation, and a suitable base 36 provides the necessary electrical connections through conventional prongs 38. If desired, a conductive coating may be applied to the inner surface of envelope 34, and utilized, for example, to shield the electrode structure. A control grid 40 is shown as a structure which is concentric with cathode 12, but it may in the alternative be divided into separate sections, each surrounding one of the anodes 16–22.

Figure 2:
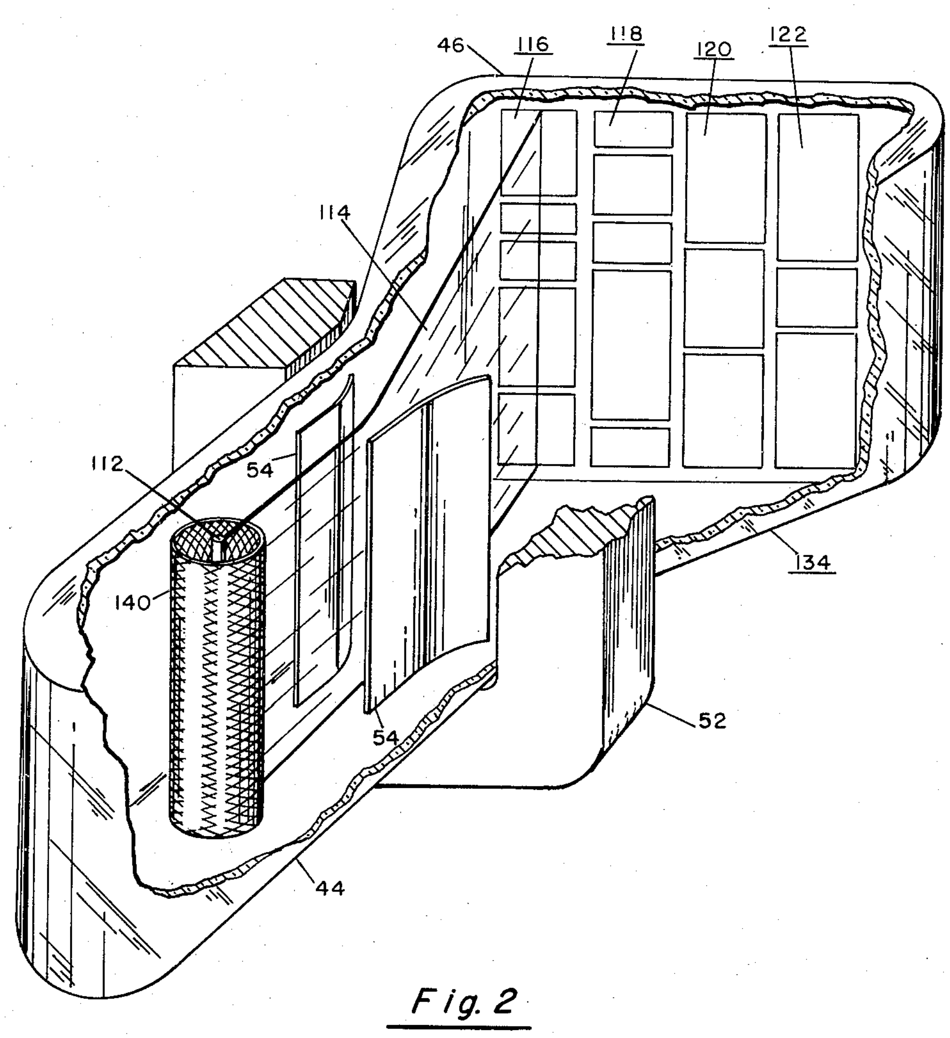
Fig. 2 illustrates another embodiment of the novel electron discharge device.

Fig. 2 illustrates another embodiment wherein a cathode ray tube consists of an envelope 134 having a neck portion 44 and a faceplate 46. Within the neck portion 44 is an electron emitting structure 112, and a control grid 140. The annular ring 52 contains means for forming the electrons into a focused, sheet-like beam 114. Potentials applied in any well known manner to deflection plates 54 cause this beam to sweep cyclically across the faceplate of the tube at the reference frequency. Alternate methods of deflection may, of course, be utilized. Blanking pulses are applied to control grid 140 in accordance with principles well known in the art.

Adjacent to, or on the inner surface of, faceplate 46 are collector anodes 116, 118, 120 and 122, any or all of which may be divided into sub-anodes. These correspond to elements 16–22 of Fig. 1. It will be understood that similar results are obtained from the rotational sweep of Fig. 1, and the rectilinear scanning of Fig. 2.

Figure 3:
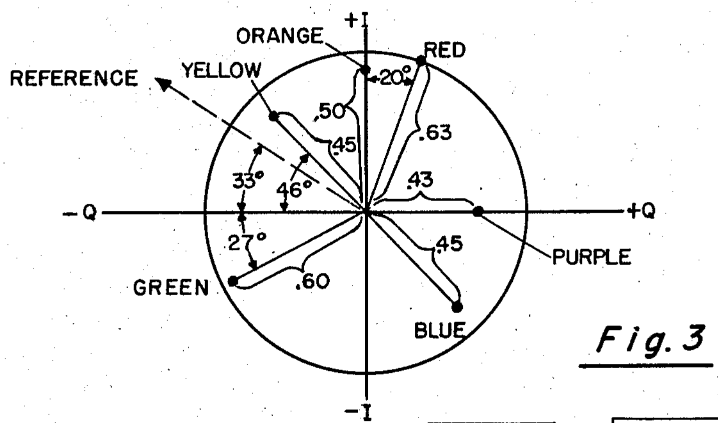
Fig. 3 depicts a color vector position chart.

Referring now to Fig. 3, there is shown a color vector position chart which is widely used in the field of color television. As has been previously stated, the telecast signal may be represented by a vector. A number of vector positions are shown to indicate the phase and relative amplitudes for the saturated colors—purple, red, orange, yellow, green, blue, and the reference or burst. Purple is represented by a vector having only a +Q component, while the orange vector has only a +I component. The other color vectors have their own particular combination; for example, the yellow vector is in the second quadrant and is a combination of .31(−Q) and .32 (+I). The position of the vectors representing the other colors and the reference may also be expressed as combinations of +Q, +I, −Q, and −I.

Figure 4:
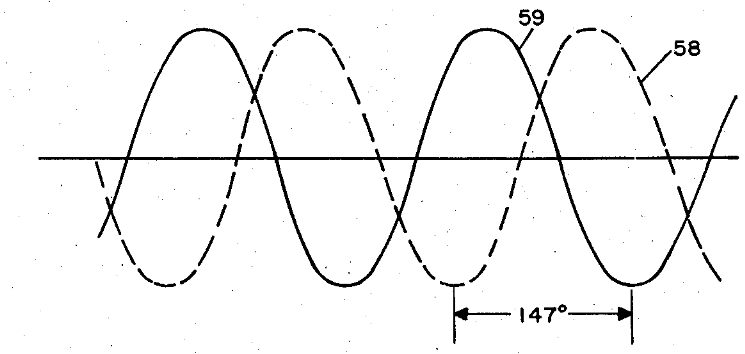
Fig. 4 shows waveform relations determined by this chart.

As is well known, these relationships may be expressed either as positioned or phased vectors, or as sine waveforms which are produced when the vectors rotate. Fig. 4 illustrates such a waveform relation, wherein the dotted "purple curve" 58 has peaks which occur 147 degrees later than corresponding peaks in the waveform 59 produced by the reference. Similarly, the curves of other colors would exhibit their own fixed characteristic relationship to the reference curve 59.

Figure 5:
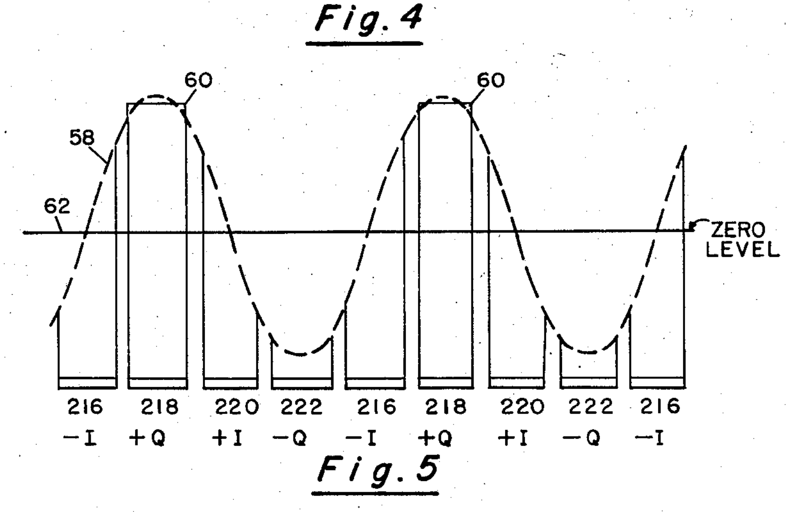
Figs. 5 and 6 illustrate the interrelation between the waveforms of Fig. 4 and elements of Figs. 1 or 2.

Referring now to Fig. 5, collector anodes 216–222 (corresponding to collector anodes 16–22 and 116–122 of Figs. 1 and 2, respectively) are diagrammatically positioned in a manner to illustrate their being sequentially and cyclically swept by the sheet-like electron beam.

Positioned above collector anodes 216–220 in Fig. 5 is the "purple curve" 58 previously described. Since this curve represents a purple color signal applied to control grid 40 of Fig. 1 or 140 of Fig. 2, the electron beam will be intensity modulated, and the vertical ordinate of the curve will represent the relative number of electrons impinging on each collector anode as the beam sweeps across it.

As may be seen, the positive peaks of the purple curve always occur when the beam is impinging on collector anode 218, thus producing the heaviest electron flow. This is a constant relationship which is determined by the relative positions of the purple vector and the reference vector in the color vector position chart of Fig. 3. The average current for anode 218 will therefore be a value represented by level 60.

While the beam is sweeping across collector anode 216, the current is increasing, and the average value will correspond to level 62. During the sweeping of collector anode 220, the electron flow, as determined by the purple curve, is decreasing, and the average value of current for anode 220 will also be represented by level 62. Level 62 is established as the black, or zero, level, and therefore no output will be obtained from either anode 216 or 220. It will be noted that during scanning of anode 222 the electron flow is a minimum, and the average current is far below zero level 62, thus resulting in a negative signal which cuts off the green gun, since no green is required to produce a purple signal.

It has been shown that a purple color at the pick-up device is converted to a vector having only a +Q component, and that the tube herein disclosed transforms the received color vector, or corresponding purple color curve, into an output signal which corresponds to +Q. If the purple color were less intense, the peaks of Fig. 5 would be lower, and smaller amplitude output signals would be produced.

In a similar manner, it may be shown that an "orange curve" would have positive peaks which correspond with the position of collector anode 220, and the output signal would therefore consist entirely of +I impulses.

Figure 6:
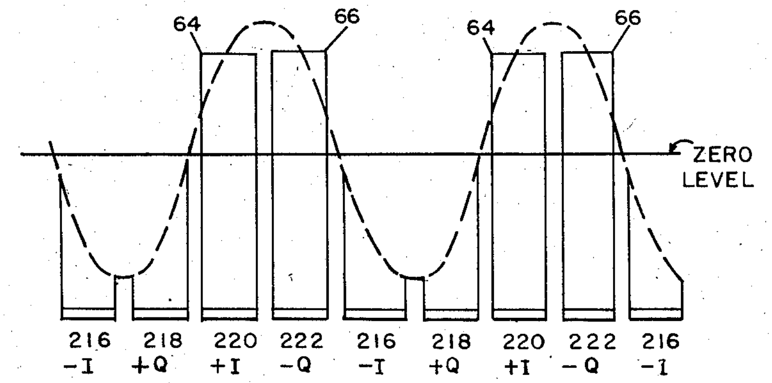

Fig. 6 illustrates the situation for "a yellow curve," wherein the positive peaks are positioned between collector anodes 220 and 222. In this case, the average current of anodes 220 and 222 are shown by levels 64 and 66, respectively. Level 64 for anode 220 (+I) and level 66 for anode 222 (−Q) are substantially equal as would be expected from both the .31 to .32 ratio previously given, and from the approximate 45 degree location of the yellow vector in the second quadrant of Fig. 3.

Other colors would similarly produce output signals composed of +Q, −Q, +I, and −I, in the proportion as determined by the color vector position chart of Fig. 3. It may thus be seen that this decoding tube transforms the received signal into the Q and I components which formed the original signal.

Referring back to Fig. 1, it may be seen that when a subdivided collector anode is being swept by an electron beam, only predetermined proportions of the total electron beam will impinge upon particular sub-anodes such as **16*a*–16*e*. The heights, or longitudinal dimensions, of the sub-anodes determine the relative number of captured electrons, and thus the magnitude of the current therethrough. Thus, the specific output currents from the various sub-anodes have fixed ratios relative to each other for a constant value of the electron beam. These currents, flowing through the individual load resistors associated with each particular sub-anode (as shown in a subsequent illustration) produce specific output signals dependent on the dimensions of the sub-anodes. Since the magnitude of the electron beam is not constant, but varies as shown in connection with the purple curve and the yellow curve, a summation or integration occurs and produces average currents as discussed in connection with levels 60–66** of Figs. 5 and 6.

Figure 7:
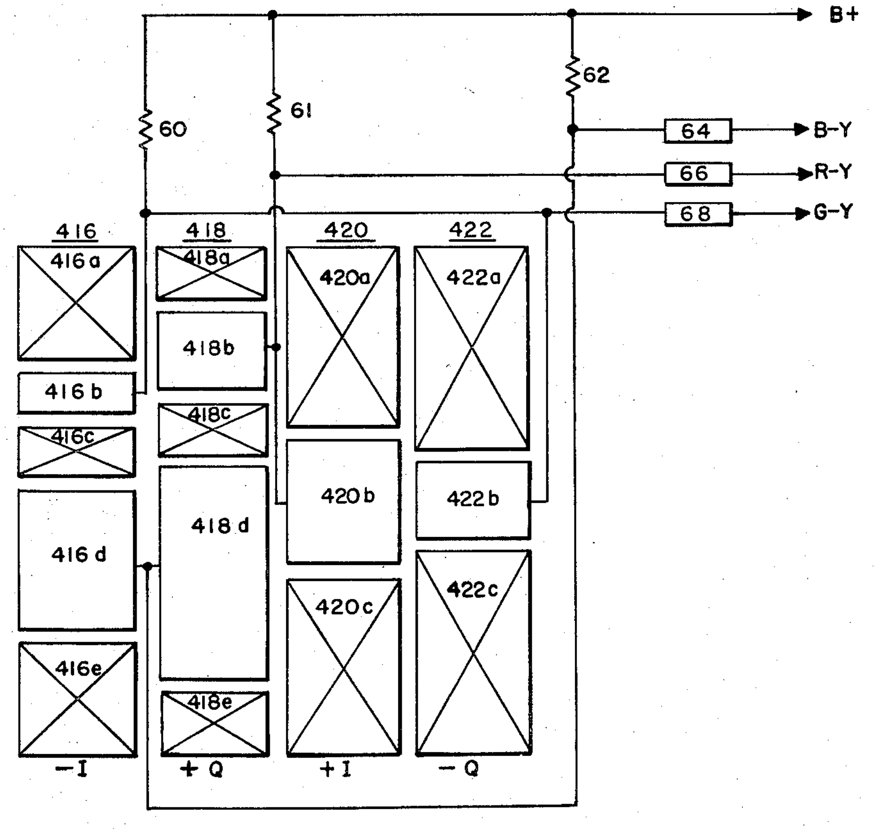
Fig. 7 illustrates a portion of the structure of the decoding tube.

Referring now to Fig. 7, the four collector anodes shown, 416, 418 and 422, correspond to the collector anodes of Figs. 1, 2, 5 and 6. Collector anode 416 is shown as divided into sub-anodes **416*a*, 416*b*, 416*c*, 416*d* and 416*e*, of which 416*b* and 416*d* are utilized to provide output signals. The other sub-anodes are available for use in either shielding, isolating, focusing, beam forming, or other similar purposes. Collector anodes 418, 420 and 422** are similarly sub-divided into the requisite number of sub-anodes. It is preferable that the centrally located sub-anodes be used for signal producing purposes in order to minimize the deleterious effects which may be caused by end fringing of the sheet-like electron beam.

When the sheet-like beam of electrons sweeps across collector anode 416, those electrons impinging on sub-anode **416*b* will cause a current to flow through load resistor 60 and thence to B+. Across resistor 60** there will appear a specific output signal which depends upon the dimensions of the sub-anode and the value of the resistor.

Simultaneously, the electrons striking sub-anode **416*d* will develop a specific output signal across another load resistor 62**.

When the beam later sweeps across collector anode 418, those electrons striking sub-anode **418*d* will also develop a specific signal across resistor 62. The separate specific output signals from sub-areas 416 and 418*d* produce across resistor 62, a composite output signal which is impressed upon utilization network 64. In a similar manner, specific output signals from other sub-anodes produce composite output signals which are impressed on utilization networks 66 and 68**. The utilization networks may be integrator circuits having time constants such that the signals are combined, instead of being transmitted sequentially. If desired, the networks may also filter out undesired frequencies.

It may thus be seen that the composition of the resultant composite output signals is widely flexible, since they consist of various specific output signals selectively combined.

To recapitulate, every telecast color signal is represented by a vector, whose phase corresponds to a color, and whose amplitude is a measure of color saturation. The tube herein disclosed demodulates this color signal into its original Q and I components, whose relative amplitudes correspond to the hue, and whose total amplitude is a measure of saturation. The sub-anodes combine desired portions of the Q and I components to form the desired composite output signals that may be applied to the color tube.

It has been shown that collector anodes 216, 218, 220, and 222 correspond to −I, +Q, +I and −Q, respectively because of their spatial relation to each other, and to the interrelation between the vectors representing the colors and the reference, as defined in the color vector position chart of Fig. 3.

It may be seen that under certain conditions the number of rotation control electrodes, and collector anodes may advantageously be other than four, and that there may be a harmonic relationship between the sweep frequency and the frequency of the modulation signal applied to the control grid.

In the type of color television receiver using the "color difference" system, color signals designated as "R—Y", "B—Y", and "G—Y" are applied to one set (control grid) of the electron gun electrodes of the color reproducer, while brightness signal "Y" is applied to another set of electrodes (cathodes). The following mathematical relationship between the colors blue, green, red, "Q", "I", and the brightness "Y", has been established by the National Television Systems Committee.

$$B-Y=1.11(-I)+1.72(+Q)+0(+I)+0(-Q)$$
$$G-Y=.28(-I)+0(+Q)+0(+I)+64(-Q)$$
$$R-Y=0(-I)+.63(+Q)+.96(+I)+0(-Q)$$

It will be noted that six of the terms have coefficients of zero, but these have been included to simplify the following explanation.

It will be seen from Fig. 7 that the resultant composite output signal, B—Y, obtained from network 64 is composed of a specific output signal from sub-anode 416*d* (representing —I) and a specific output signal from sub-anode 418*d* (representing +Q). No signals are obtained from collector anodes 420 (+I) or 422 (—Q), indicating that in these cases the coefficients are zero in accordance with the first equation given above. Therefore, the height dimensions of sub-anode 416*d*, (—I), and 418*d*, (+Q) bear a 1.11 to 1.72 ratio as determined by the coefficients of —I and +Q in the "B—Y" equation established by the N. T. S. C.

Collector anode 418, which corresponds to +Q, has two signal producing sub-anodes: 418*b* which contributes to composite output signal R—Y, and 418*d* which contributes to composite output signal B—Y. The sub-anode dimensions therefore bear a .63 to 1.72 relation, as required by the coefficients of +Q in the R—Y and the B—Y equations. In this manner the various sub-anodes may be dimensioned to correspond to a given set of equations. Any signal applied to the control grid would therefore be dissected into specific output signals proportional to the heights of the sub-anodes, and these specific output signals would be combined to form the desired composite output signals, such as B—Y, R—Y and G—Y.

The elements of Fig. 7 have been selected to illustrate a particular use, namely a decoding operation in a color television receiver using color difference signals. In this case the utilization networks 64, 66 and 68 would be integrating circuits containing filters which bypass the sub-carrier frequency to ground. The resultant output takes the form of the desired color difference signals, and would be applied to the various electron guns of the picture tube in a color difference receiver circuit.

When it is desired that the decoding tube herein disclosed be designed for other purposes, the following principles should be used. Set up a general set of equations in which various inputs ($I_1, I_2, I_3, I_4$ . . . ) are combined in accordance with coefficients (A, B, C, D . . . ) to produce outputs ($0_I, 0_{II}, 0_{III}$ . . . ).

The general set of equations will appear as follows:

$$0_I=AI_1+BI_2+CI_3+DI_4+ \ldots$$
$$0_{II}=A'I_1+B'I_2+C'I_3+D'I_4+ \ldots$$
$$0_{III}=A''I_1+B''I_2+C''I_3+D''I_4+ \ldots$$

It will be understood that the coefficients A, B, C, D, . . . , A′, B′, C′, D′, . . . , A″, B″, C″, D″, . . . , etc. may in some cases be zero, as has been previously shown.

The dimensions for the various sub-anodes are then obtained from the coefficients in the manner previously described, and the desired sub-anodes are then interconnected to obtain the desired composite output signals.

Figure 8:
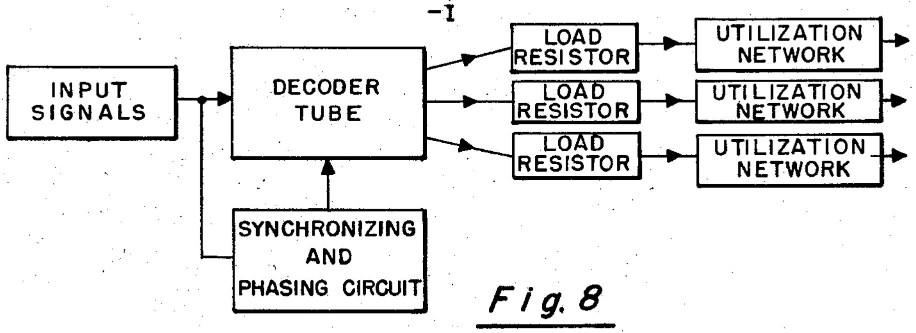
Fig. 8 is a block diagram of one embodiment of a circuit utilizing the novel electron discharge device.

Fig. 8 illustrates in block diagram form, the basic elements for a circuit utilizing the novel electron tube herein described. Input signals are applied to the control grid structure of the decoder tube. These signals may have been modulated onto a carrier, or may merely bear a timed or phased relation to each other. A properly synchronized and phased potential is applied to the sweep control electrodes. Suitably proportioned sub-anodes are interconnected, and the respective load resistances feed utilization networks to provide the desired composite output signals.

Figure 9:
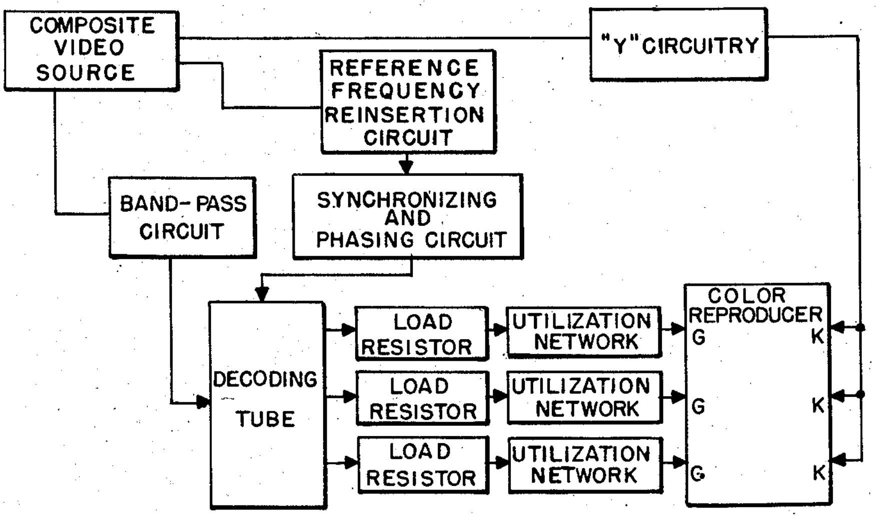
Fig. 9 is a block diagram illustrating the incorporation of this device into a color television receiver.

Fig. 9 illustrates, in block diagram form, a suitable circuit for a television receiver utilizing color difference signals. For the particular color system shown the Y information does not require decoding, and is applied through appropriate circuitry to the cathodes K of the electron guns. Composite video signals are fed to a bandpass circuit which passes only that spectrum encompassing the chrominance carrier. This signal is applied to the control grid of the disclosed tube. A portion of the composite video signal containing the reference carrier color burst is meanwhile fed to a reference frequency reinsertion circuit which supplies to the deflection electrodes a properly synchronized voltage for controlling the sweep, either rotational or rectilinear. Since this voltage must be applied sequentially to the rotation or to the scan control electrodes, a separate phasing or delay network may be utilized. The specific output signals from the sub-anodes of the decoding tube are fed through load resistors and utilization networks as previously explained, and are then applied to the appropriate control grids of the color reproducer. Meanwhile, the "Y" or brightness portion of the composite video signal, is delayed, amplified, and otherwise properly treated, and then applied to the cathodes of the color reproducer.

While the foregoing principles have been generally presented in terms of a circuit for a particular color television system, it may be seen that they are readily applicable to other systems and applications. It is only necessary that the appropriate equations be put into a general form as heretofore described, that the dimensions of the sub-anodes be properly determined, and a properly synchronized and phased deflection voltage be utilized.

The use of the principles disclosed is further indicated wherever it is desired that signals be matrixed, decoded, or dissected and recombined. One example of this would be in computer circuits. Another use would be in military gun-aiming equipment, where remote stations transmit information such as range, azimuth, and elevation, which information must be mixed, decoded, and evaluated.

While the basic principles, and several embodiments and uses have been described, others will occur to those versed in the various arts. I desire, therefore, to be limited not by the foregoing specification, but rather by the claims granted to me.

What is claimed is:

1. A decoding circuit comprising in combination: an electron discharge device of the scanning sheet beam type, said device having an electron emitting cathode, a plurality of scan control electrodes, a plurality of collector anodes positioned to be sequentially swept by said sheet beam, selected collector anodes being divided into sub-anodes positioned to be simultaneously swept by said beam; means to intensity-modulate said beam; a source of input signals; means applying said input signal to said intensity-modulating means; synchronizing and phasing means energized by said source; means applying the output of said synchronizing and phasing means to said scan control electrodes; output signal producing means connected to respective sub-anodes; a plurality of utilization networks; and means applying selected output signals to said utilization networks to produce composite output signals.

2. A decoding circuit comprising: an electron discharge device of the rotating sheet beam type having an axial electron-emitting cathode; a plurality of rotation control electrodes, said electrodes being arcuate sections of a cylinder; a plurality of collector anodes, said collector anodes being arcuate sections of a cylinder positioned to be sequentially swept by said sheet beam, selected collector anodes being divided into sub-anodes positioned to be simultaneously swept by said sheet beam; means to intensity-modulate said beam; a source of input signals; means applying said input signals to said intensity-modulating means; synchronizing and phasing means energized by said source; means applying the output of said synchronizing and phasing means to said rotation control electrodes; output signal producing means connected to respective sub-anodes; a plurality of utilization networks; and means for applying selected specific output signals to said utilization networks whereby a composite output signal is produced.

3. A decoding circuit for a color television receiver comprising in combination: an electron discharge device of the rotating sheet beam type having an axial electron-emitting cathode; a plurality of rotation control electrodes, said electrodes being arcuate sections of a cylinder; a plurality of collector anodes, said collector anodes being arcuate sections of a cylinder positioned to be sequentially swept by said sheet beam, selected collector anodes being divided into sub-anodes positioned to be simultaneously swept by said sheet beam; means for modulating the intensity of said beam; a source of composite video information; energizing means applying signals to said rotation control electrodes, said energizing means including a circuit for generating a reference frequency which is synchronized and phased with a transmitted color burst; second energizing means applying said video information to said intensity-modulating means, said second energizing means including a bandpass filter; output signal producing means comprising separate load resistors connected to respective sub-anodes; a plurality of utilization networks; and means for applying selected specific output signals to said utilization networks whereby a composite output signal is produced.

References Cited in the file of this patent

UNITED STATES PATENTS

| | | |
|---|---|---|
| 2,217,774 | Skellett | Oct. 15, 1940 |
| 2,725,425 | Sziklai | Nov. 29, 1955 |
| 2,733,409 | Kuchinsky | Jan. 31, 1956 |
| 2,768,319 | Spracklen | Oct. 23, 1956 |